United States Patent [19]
Courtney et al.

[11] Patent Number: 5,123,598
[45] Date of Patent: Jun. 23, 1992

[54] PORTABLE SPREADING DEVICES

[75] Inventors: Steve P. Courtney, Westerville; James D. Amerine, Marysville, both of Ohio

[73] Assignee: The O. M. Scott & Sons Company, Inc., Marysville, Ohio

[21] Appl. No.: 564,948

[22] Filed: Aug. 7, 1990

[51] Int. Cl.⁵ .............................. A01C 17/00
[52] U.S. Cl. .................. 239/686; 239/526; 239/683; 222/473
[58] Field of Search ............. 239/375, 379, 652, 653, 239/683, 686, 154, 526, 687; 222/470, 472, 473, 175; 251/321, 326, 285

[56] References Cited

U.S. PATENT DOCUMENTS

| | | | |
|---|---|---|---|
| 2,868,421 | 1/1959 | Schott | 239/375 |
| 3,157,402 | 11/1964 | Love, Jr. | 239/686 |
| 3,227,461 | 1/1966 | Love, Jr. | 239/686 |
| 4,492,341 | 1/1985 | Allen | 239/686 |
| 4,534,512 | 8/1985 | Chow et al. | 239/526 |
| 4,588,133 | 5/1986 | Brabb et al. | 239/687 |
| 4,867,381 | 9/1989 | Speicher | 239/687 |
| 4,909,443 | 3/1990 | Takagi | 239/526 |

FOREIGN PATENT DOCUMENTS

2080884 2/1982 United Kingdom ............ 239/375

Primary Examiner—Andres Kashnikow
Assistant Examiner—Karen B. Merritt
Attorney, Agent, or Firm—Jones, Day, Reavis & Pogue

[57] ABSTRACT

A hand held spreading device is disclosed for broadcast spreading material via a rotating impeller. The device has an actuating assemly including an actuating member and a dual spring arrangement interconnected with the actuating member. One of the springs causes material to be discharged onto the impeller in response to movement of the actuating member and prevents damage of the device resulting from excessive movement of the actuating member. The second spring biases the actuating member to move to an idle position in which no material is discharged onto the impeller and causes the actuating member to return to this idle position after movement thereof.

20 Claims, 4 Drawing Sheets

PORTABLE SPREADING DEVICES

BACKGROUND OF THE INVENTION

1. Field of the Invention

The present invention relates in general to portable spreading devices. More particularly, the invention relates to hand-held, manually operated spreading devices for use in broadcasting particulate materials such as granular fertilizers and the like.

2. Description of Related Art

Various portable, hand-held material spreading or broadcasting devices have been disclosed heretofore. For example, U.S. Pat. Nos. 3,157,402; 3,226,461 and 4,492,341 show versions of such devices which employ valve members normally spring biased to a closed position for shutting off flow of material from a storage chamber to a broadcasting impeller. In the devices disclosed therein, the valve member is opened by operation of a manually displaceable actuating member to enable material to flow from the storage chamber onto the broadcasting impeller. The actuating member is positioned for engagement and displacement by a finger, usually a thumb, of the hand grasping the handle. A crank handle is provided for manipulation by the user's other hand to cause the impeller to rotate and broadcast the material deposited thereon. The devices also include adjustment members which may be set to determine the degree of opening of the valve member from fully open to some intermediate position upon operation of the actuating member.

These prior devices have been found to present problems in regard to their tendency to break as a result of the user subjecting the operating components of the devices to overstressed conditions by exerting an excess force on the actuating member in an attempt to achieve a greater flow of material through the device. For example, U.S. Pat. No. 4,492,341 attempts to provide a solution to this problem by installing a stop element adjacent the actuating member in order to prevent excessive displacement of the actuating member. Also, the actuating member supporting structure is formed from a material and is dimensioned to flex without breaking upon forced movement of the actuating member. However, these proposed modifications have not fully solved the inherent premature destruction problems encountered with these prior devices. Furthermore, these modifications have not totally corrected another problem in the design of these prior devices. That is, if sufficient force is applied on the actuating member by a user of the device, the actuating member may be displaced from its original set position to an unselected position whereby the valve opening is reset to provide an undesired material flow rate from the device.

In addition, as designed these prior devices normally require constant finger or thumb pressure to be applied to the actuating member in order to continue dispensing particulate material for broadcast spreading. Accordingly, a human engineering or ergonomic problem is presented since these prior devices have not been configured to satisfactorily accommodate prolonged finger or thumb engagement with the actuating member. In practice, it has been found that the finger or thumb which is employed to hold the actuating member in operative engagement encounters an undesirably high degree of fatigue as a result of the application of constant pressure.

Furthermore, it has been found that as the user's finger or thumb tires through prolonged usage of these prior devices, the finger or thumb will back off in exerting force on the actuating member and the extent of valve opening will be impacted thereby resulting in varying levels of granular material being dispensed or applied to adjoining sections of a lawn or other such area causing striated or patchy growth therein. Also, in the construction of these devices, there is no capability to release the thumb or finger pressure on the actuating member and to continue broadcasting material from the devices. Therefore, in the absence of such a locking mechanism, once the finger or thumb pressure is removed all dispensing of material will cease whether such action is desired or not.

In other prior devices such as those known as the "Handi-Spred" Lawn and Garden Spreader of Precision Products, Inc. and "The Little Bit" Spreader of Global Products, Inc., the products are constructed to operate without maintaining pressure or force on the valve actuating and setting mechanism. In such devices, the extent of opening of the valve member to allow material to flow from the storage chamber to the broadcasting impeller is preselected by moving the actuating member into engagement with a locking mechanism which sets the valve opening at a preselected level. Thus, in order to shut off material flow with these devices, it is necessary to physically disengage the actuating member from the locking mechanism and move it to a position corresponding to a closed valve condition.

Thus, an inherent problem in the construction of these prior devices results from their tendency to continue dispensing material to the impeller even in the event that the impeller ceases to be rotated to broadcast such material. That is, since there is no automatic release feature in these so-called "on-off" or delivery devices, any momentary or extended cessation of operation of the device requires manual disengagement of the actuating member from the open or on condition to avoid undesired release of material.

Further problems have been encountered with these prior art devices in regard to the necessity to readjust the application rate to a specified level each time use of the device is resumed after some stoppage. Furthermore, these "on-off" devices have generally been found to be cumbersome in construction including more moving parts than automatic release, spring biased designs. Consequently, a problem of wear of the additional moving parts is presented by these devices.

SUMMARY OF THE INVENTION

In response to the above-noted shortcomings of the prior art, the present invention has been developed. The invention provides a portable hand-held manually operated device for broadcasting or spreading granular materials such as fertilizers, herbicides, pesticides, seeds and the like. The device includes a housing having a storage chamber affixed to a manually engagable pistol grip-type handle. The storage chamber is positioned over an impeller and includes an opening or port for gravitational flow of material from the chamber onto the impeller. The impeller is horizontally disposed and is structured to rotate in order to broadcast or spread material deposited thereon in a direction lateral to and longitudinally forward of the device.

A valve member is mounted for reciprocal motion across the port to regulate the flow of material in response to the operation of an actuating assembly. The actuating assembly includes an actuating member, preferably a trigger-like member, mounted on the surface of the pistol grip-type handle and a dual spring arrangement interconnected with the actuating member.

A first spring of the dual spring arrangement is operatively interconnected with the valve member via a linkage in a manner such that upon depression of the actuating member, this first spring causes the valve member to move and open the port. As the actuating member is further depressed, the valve continues to move under the influence of the first spring and linkage until the valve member contacts a stop member on a rate adjusting assembly which is mounted on the handle in position to engage the valve member when it has moved a sufficient distance to provide a preselected extent of opening of the port.

Since the stop member prohibits further movement of the valve member beyond the selected point, continued depression of the actuating member could result in damage of the internal operating componentry of the device as has been the case in the above-noted prior devices. However, in the present construction, any further depression of the actuating member past the point at which the valve member contacts the stop member will result in an overtravel condition of the first spring of the dual spring arrangement wherein the spring collapses and can no longer cause movement of the valve member via the linkage. Accordingly, further depression of the actuating member will not cause damage to the internal components of the device since no further stress is applied thereto by virtue of such action.

The second spring of the dual spring arrangement is prestressed or tensioned so as to constantly apply a force on the actuating member biasing the member to its initial idle or undepressed position. Thus, the second spring of the dual spring arrangement performs a return function so that upon release of the application of force depressing the actuating member at any stage, the second spring causes the valve member to return to its initial closed position via movement of the actuating member to its undepressed state under the influence of the second spring and such movement of the actuating member causes the first spring and the linkage to act on the valve member.

In a modification of the invention, a mechanism is provided for locking the actuating member in an engaged or depressed state. This mechanism enables the flow of material from the storage chamber to the impeller to be maintained at a predetermined, selected rate without applying continuous pressure on the actuating trigger.

A general object of the invention is to provide an improved portable, hand-held spreading device.

Another object of this invention is to provide a hand-held, manually operated spreading device in which the actuating member can be subjected to a high degree of force by excessive depression of the actuating member without overstressing or causing breakage of the operating components of the device. A related object is to provide such a spreading device in which the actuating member can be subjected to excessive force without causing displacement of the preset valve opening to an unselected position resulting in an undesired material flow rate.

A further object of this invention is to provide an ergonomically advantageous hand-held, manually operated spreader construction including a pistol grip-type handle for holding the device with a trigger-like actuating member for alleviating fatigue of the user's hand during use of the device and to avoid back off of force exerted on the actuating member by the user during prolonged use whereby more constant material flow rates can be maintained.

A still further object is to provide a hand-held manually operated spreading device having an automatic release feature biasing the actuating member to its undepressed condition to avoid undesired release of material upon cessation of operation and readjustment requirements.

Another object is to provide a hand-held, manually operated spreading device having fewer moving parts to enable a more streamlined, long-lasting structure which may be produced effectively at lower cost and which presents a visually appealing and aesthetically attractive appearance.

Other objects of the invention, in addition to those set forth above, will become apparent to one skilled in the art from the following description.

DESCRIPTION OF THE PREFERRED EMBODIMENTS

Figures 1, 2A:
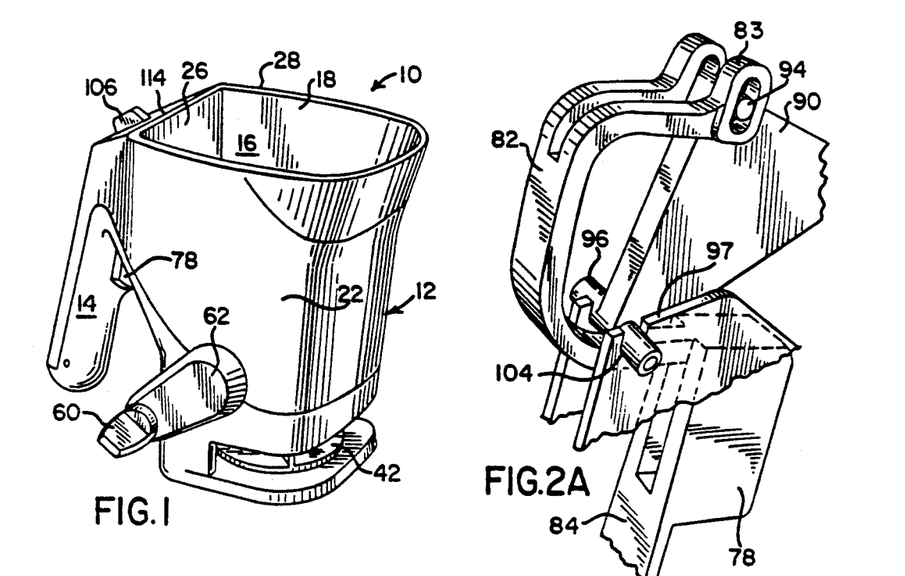
FIG. 1 is a perspective view of a spreading device in accordance with the present invention.
FIG. 2A is a fragmentary view of the trigger-like actuating member and one spring of the dual spring arrangement of FIG. 2 depicting in detail the interconnection of the spring with an intermediate linkage.

FIG. 1 shows a spreading device 10 of the present invention having a housing 12 including a manually engagable pistol grip-like handle 14 and a storage chamber or hopper 16 for accommodating flowable granular or particulate materials such as fertilizers, herbicides and other pesticides, seeds and the like. The storage chamber 16 has an open top end 18 to receive the material and a bottom wall 20 and peripheral side walls 22 are provided in the housing 12 to enclose the chamber 16. The housing 12 also includes an internal side wall 24 having an upper or first section 26 extending downwardly essentially at a right angle to an outer edge surface 28 at the open top end 18 of chamber 16 and a lower or second section 30 extending slopingly downward from the bottom of the first section 26. This internal wall 24 separates the storage chamber 16 from a recess area 32 formed in handle 14 so that the operating components of the device 10 which are housed in the handle 14 are shielded from the material stored in chamber 16.

Figure 2:
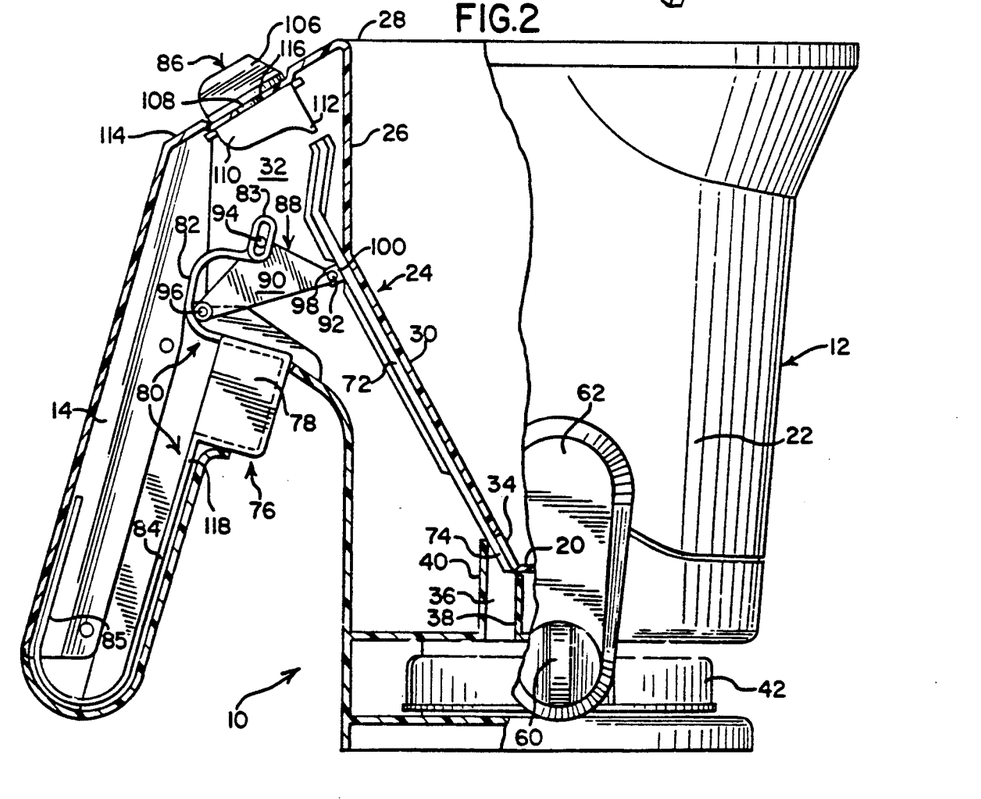
FIG. 2 is a side elevational view of the device shown in FIG. 1 with a portion of the housing broken-away to illustrate a valve operating assembly of the device including a trigger-like actuating member depicted in an initial, undepressed state and a dual spring arrangement interconnected with the trigger for causing reciprocal movement of the valve member and for biasing the trigger to the undepressed state.
Figure 5:
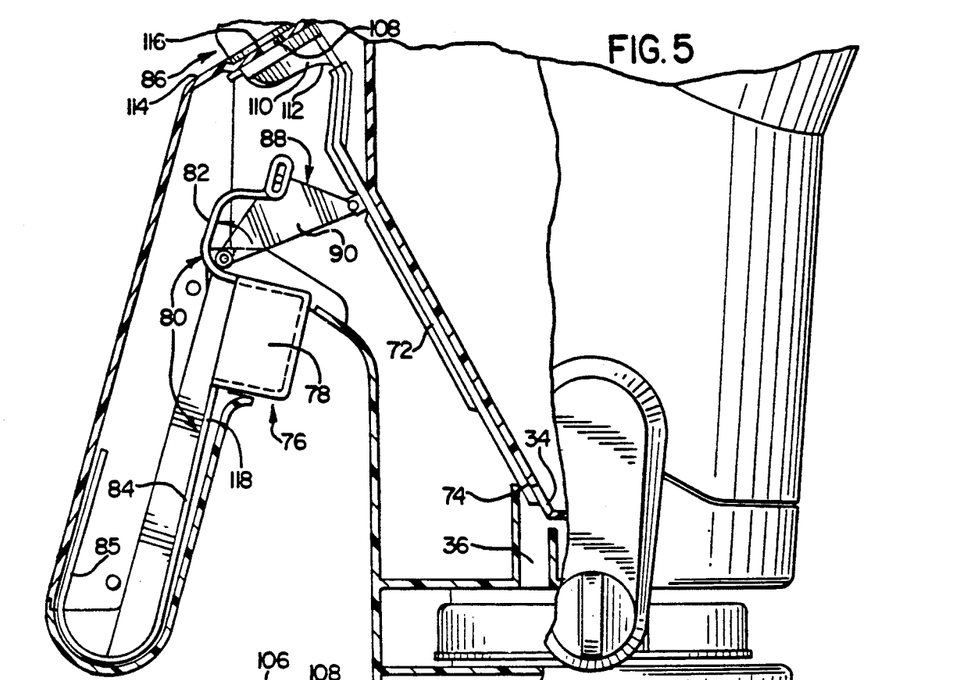
FIG. 5 is a side elevational view similar to that shown in FIG. 2 with the trigger-like actuating member depressed to an extent causing the valve member to have moved into contact with a stop member of a rate adjusting assembly.
Figure 6:
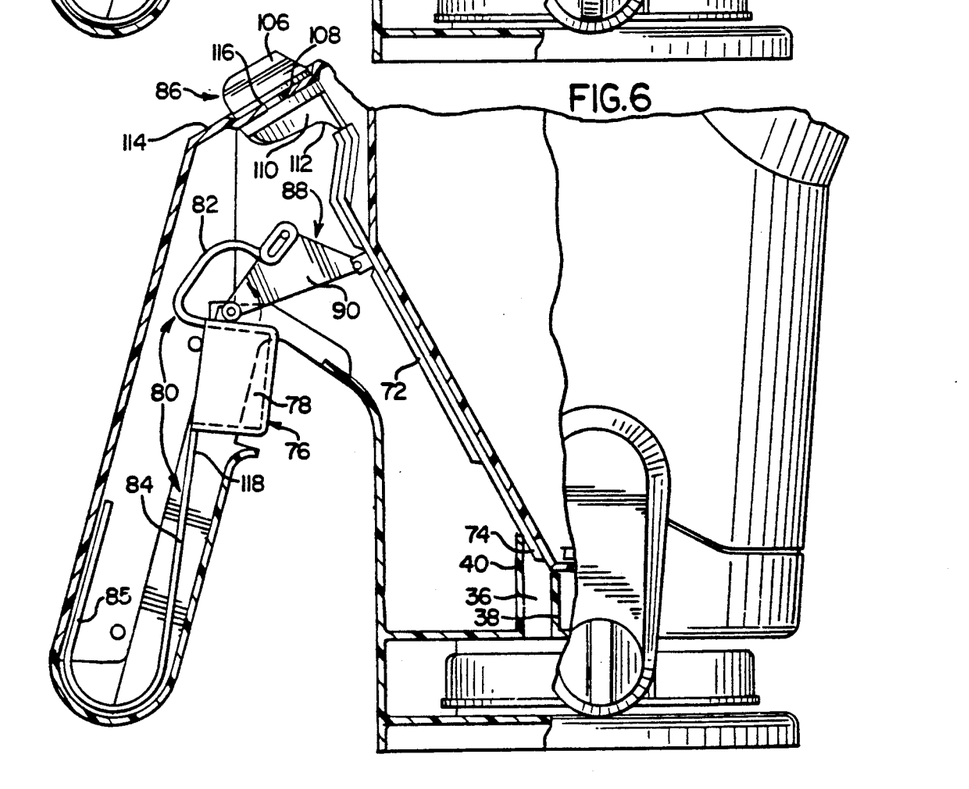
FIG. 6 is another side elevation similar to that shown in FIGS. 2 and 5 with the trigger-like actuating member depressed to a further extent than illustrated in FIG. 5.

As best illustrated in FIGS. 2 and 5-6, a port or opening 34 is provided between the bottom of the sloping second section 30 of wall 24 and the adjacent bottom wall 20 of storage chamber 16 to enable gravitational flow of material through a chute 36 having front and rear walls 38 and 40, respectively, leading downwardly and outwardly from port 34 in storage chamber 16 onto an essentially horizontally rotating impeller 42 positioned beneath the storage chamber 16.

Figure 3:
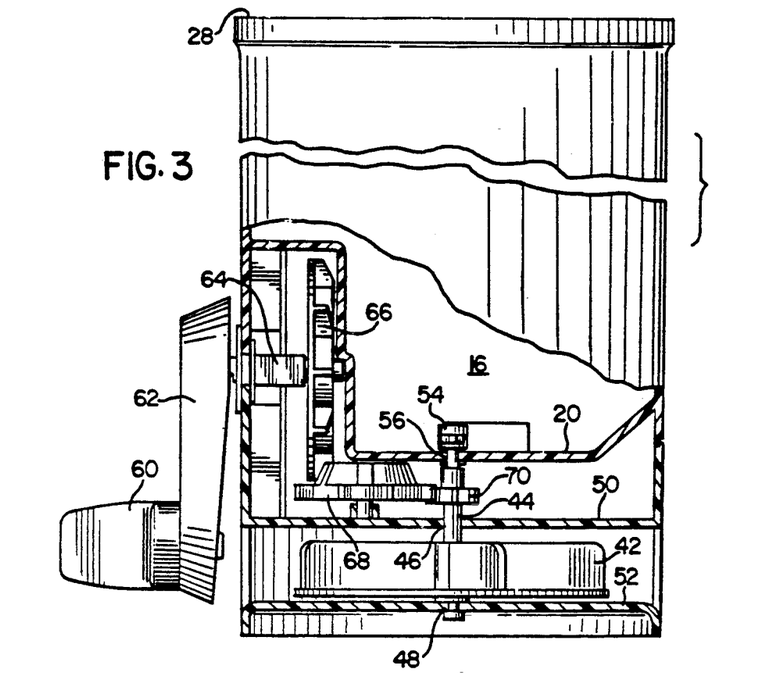
FIG. 3 is a front elevational view of the device shown in FIG. 1 with a portion of the housing broken away to illustrate an impeller operating assembly of the device including a gear arrangement.
Figure 4:
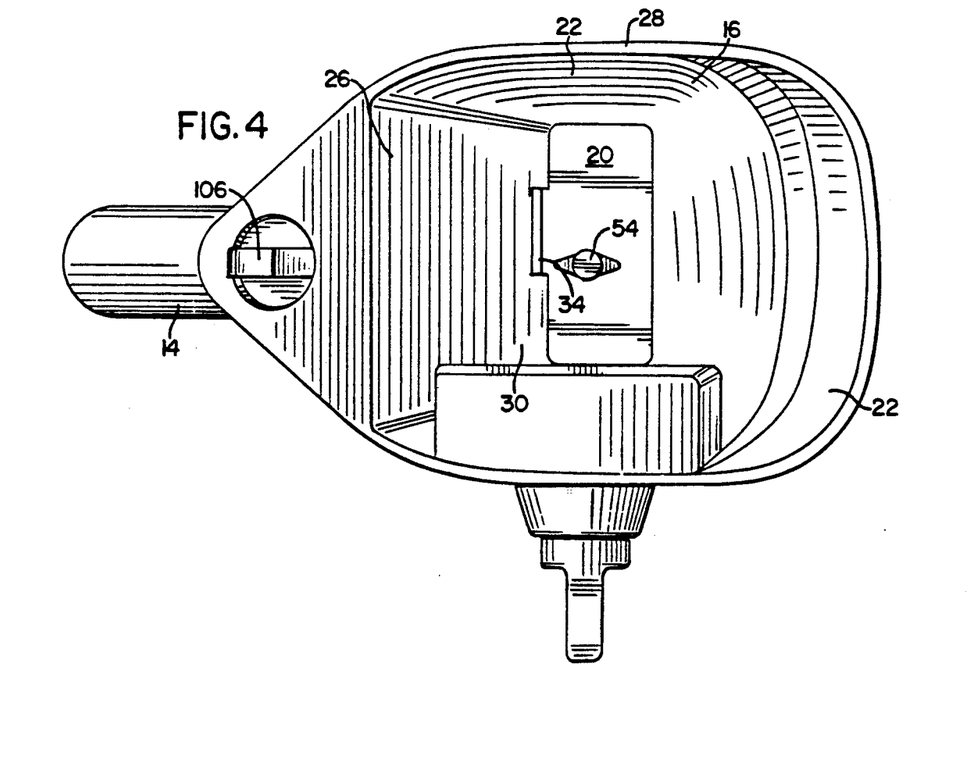
FIG. 4 is a top plan view of the device shown in FIG. 1.

The mechanism for operation of impeller 42 is best illustrated in FIGS. 3 and 4 wherein impeller shaft 44 is shown journaled in bearings 46 and 48 respectively provided in spaced transversely extending housing walls 50 and 52. The shaft 44 is keyed to the hub or impeller 42 so that the impeller rotates with the shaft 44. An agitator number 54 is secured to the upper end of the shaft 44 which protrudes into storage chamber 16 through hole 56 in bottom wall 20 of the chamber 16. The agitator 54 rotates with the shaft 44 to stir the material in the chamber 16 and to facilitate the flow of material from the storage chamber 16 through port 34 and into chute 36.

Shaft 44 is driven by a gear and crank assembly including a crank knob 60, a crank 62, a crank shaft 64, a bevel gear 66, a pinion gear 68 and a drive gear 70 which is affixed to the shaft 44. In operation, the crank 62 is rotated by a user of device 10 in either a clockwise or counterclockwise direction by application of force on crank knob 60. The crank knob 60 is freely rotatable on the crank 62 and transfers force from the hand of the user to the crank. The crank 62 is operatively interconnected with bevel gear 66 via crank shaft 64 so that rotational force applied to the crank 62 is transferred to the bevel gear 66 which rotates in the same direction as the crank 62. The bevel gear 66 meshes with pinion gear 68 causing the rotational force of bevel gear 66 to be transferred to pinion gear 68 and causing gear 68 to rotate. The pinion gear 68 then transfers this rotational force to the drive gear 70 and the affixed shaft 44 in a manner such that the shaft 44 rotates in a direction opposite the rotational direction of pinion gear 68. Thus, rotation of crank 62 on handle 14 results in rotation of shaft 44 which in turn causes impeller 42 which is connected to shaft 44 to rotate and to broadcast spread material deposited thereon in a pattern lateral to and longitudinally forward of the device 10.

Valve member or shut-off slide plate 72 is mounted for sliding, reciprocating motion in a plane generally parallel to the sloping plane of second section 30 of wall 24 so that an end valve member 74 moves across port 34 to regulate the opening of the port and, consequently, the flow of material through the port 34. In assembly, the valve member 72 is operatively supported adjacent end section 74 by the rear wall member 40 of chute 36.

The valve member 72 is normally biased to a closed position with the end section 74 covering the port 34 via operation of trigger assembly 76 housed in recess area 32 in handle 14. As best illustrated in FIGS. 2 and 5-6, trigger assembly 76 includes a trigger-like actuating member 78 and a dual spring arrangement generally designated 80 including a first spring 82 and a second spring 84.

Actuating member 78 is mounted on the surface of the pistol grip-like handle 14 in a manner such that in normal use of the device 10, the user can comfortably and efficaciously grasp the device by the handle 14 with either hand and the actuating trigger 78 will be readily accessible to the index finger of the user's hand to achieve desirable ergonomic and human engineering attributes in operating the device 10.

Within recess 32 in handle 14, spring 82 extends generally upwardly from actuating member 78 while spring 84 extends generally downwardly therefrom. As will be described hereinafter, spring 82 is structured and dimensioned to cause valve 72 to move in response to movement of actuating member 78 and, also, to compensate for any overtravel conditions of the actuating member 78 as it is depressed into recess 32 in handle 14 whereby breakage and overstressing of the operating components of the device 10 is prevented. As best illustrated in FIG. 2A, spring 82 is generally configured in a C-shape and has a looped extension section 83 formed at its distal end.

Spring 84 is structured and dimensioned to bias actuating member 78 to an undepressed, non-operative condition and further functions as a return means for the actuating member 78, preferably, applying a return pressure or force in the range of about 1-3 lbs. on the actuating member 78. As illustrated spring 84 is shaped to generally conform to the shape of the lower portion of the handle 14 and includes a hooked distal end section 85 which prior to installation in the handle 14 is skewed outwardly between about 5° and 25°, preferably 5° to 10°, relative to its vertical axis. Thus, upon installation, the hooked distal end section 85 of spring 84 is force fit into the handle 14 causing the end section 85 to generally conform to the shape of the handle and to provide a prestressed tension or pressure which is transmitted to the actuating member 78 by spring 84 as a biasing or return pressure.

As illustrated, springs 82 and 84 are formed as an integral one piece assembly with actuating member 78. However, if desired, these members may be produced separately or with only partial integration of components. Furthermore, the constituent components of the assembly 76 are normally formed from suitable plastic materials although metal parts may be employed, if desired.

Movement of valve member 72 to a preselected intermediate or full flow opening position as set by a rate determining cam assembly 86 to be described hereinafter, is controlled by operatively connecting trigger assembly 76 with the valve member 72 via linkage assembly 88. Linkage 88 includes a triangular link member 90 having pegs or pins 92, 94 and 96 arranged respectively, at each of the three corners of the triangle. Peg 92 is structured and dimensioned to mateably cooperate with a notch or groove 98 formed in a projection or tang 100 extending from the surface of valve member 72. As best illustrated in FIG. 2A, peg 94 is structured and dimensioned to mateably engage with the looped extension 83 of spring 82 and peg 96 is structured and dimensioned to pivotally engage with a notched or grooved surface 104 formed in a ledge or shelf portion 97 of housing 12 which projects inwardly into recess 32 in handle 14.

As illustrated, the rate determining cam assembly 86 has a manually manipulatable rate knob or dial 106 providing a number of selectable setting positions, each representing a particular selected flow rate of material from the storage chamber 16. The assembly 86 further includes a stem 108 extending from the knob 106 and a cam member 110 having an inwardly and downwardly projecting cam stop surface 112 positioned thereon. The assembly 86 is rotatably mounted on an upwardly projecting surface 114 of handle 14 with the knob 106 positioned externally of the surface 114 and the stem 108 extends through a hole 116 formed in surface 114 to engage and interconnect with the cam member 110 positioned in recess 32 in handle 14. Thus, rotation of the knob 106 results in a coextensive rotation of the cam member 110 whereby the cam stop surface 112 is adjusted to alter the extent of movement of valve member 72 and the resulting flow of material through port 34 in storage chamber 16 in a manner to be described hereinafter.

In operation, as the user of the spreading device 10 begins to depress the trigger-like actuating member 78, spring 82 of dual spring arrangement 80 begins to act on linkage assembly 88 via engagement of the looped terminal extension 83 of spring 82 with peg 94 on link member 90. This action causes link 90 to begin to pivot in a counterclockwise direction, illustrated by arrows in FIGS. 5 and 6, about a fulcrum provided by the pivotal engagement of peg 96 and notched surface 104 on handle 14 in order to begin to move valve member or shut-off slide plate 72 upwardly as a result of the transfer of the counterclockwise pivoting movement of link 90 to valve 72 via engagement of peg 92 in notch 98 in valve projection 100. The upward movement of valve member 72 continues as the trigger-like actuating member 78 continues to be depressed and until valve member 72 abuttingly engages cam stop surface 112 on cam member 110 of cam assembly 86 which is preset by operation of rate knob 106. This upward movement of valve member or shut-off slide plate 72 causes port 34 in storage chamber 16 to open so that the particulate material in the chamber 16 is channeled out of chute 36 and deposited onto impeller 42 by gravitational flow from which it is broadcast or spread in a lateral and longitudinally forward direction.

As the user of the device 10 continues applying force by depressing the trigger-like actuating member 78 after the valve member 72 has contacted and engaged the cam stop 112 as best illustrated in FIG. 6, the overtravel spring 82 of the dual spring arrangement 80 interconnected to actuating member 78 collapses which enables further depression of the trigger 78 to its most extreme extent of depression without causing an additional movement of the valve member and without causing any damage or overstressing of any of the operating components of the device 10 such as the pegs 92, 94, 96 on link 90 of linkage 88; the projection 100 on valve member or shut-off slide plate 72, or the notched surface 104 of handle 14.

In regard to the operation of the return spring 84 of the dual spring arrangement 80, this spring 84 is prestressed or tensioned to apply a constant force on the trigger actuating member 78 biasing the trigger 78 to an undepressed or idle condition. Furthermore, as the user of the device 10 applies depressive pressure on the trigger 78, additional tension is exerted on the spring 84 via the hooked distal end section 85 of the spring 84 in contact with the pistol grip-like handle 14 which causes an upper section 118 of the spring 84 adjacent the trigger 78 to bow and to further promote return of the trigger-like actuating member 78 to its initial, undepressed condition.

Figures 7, 8:
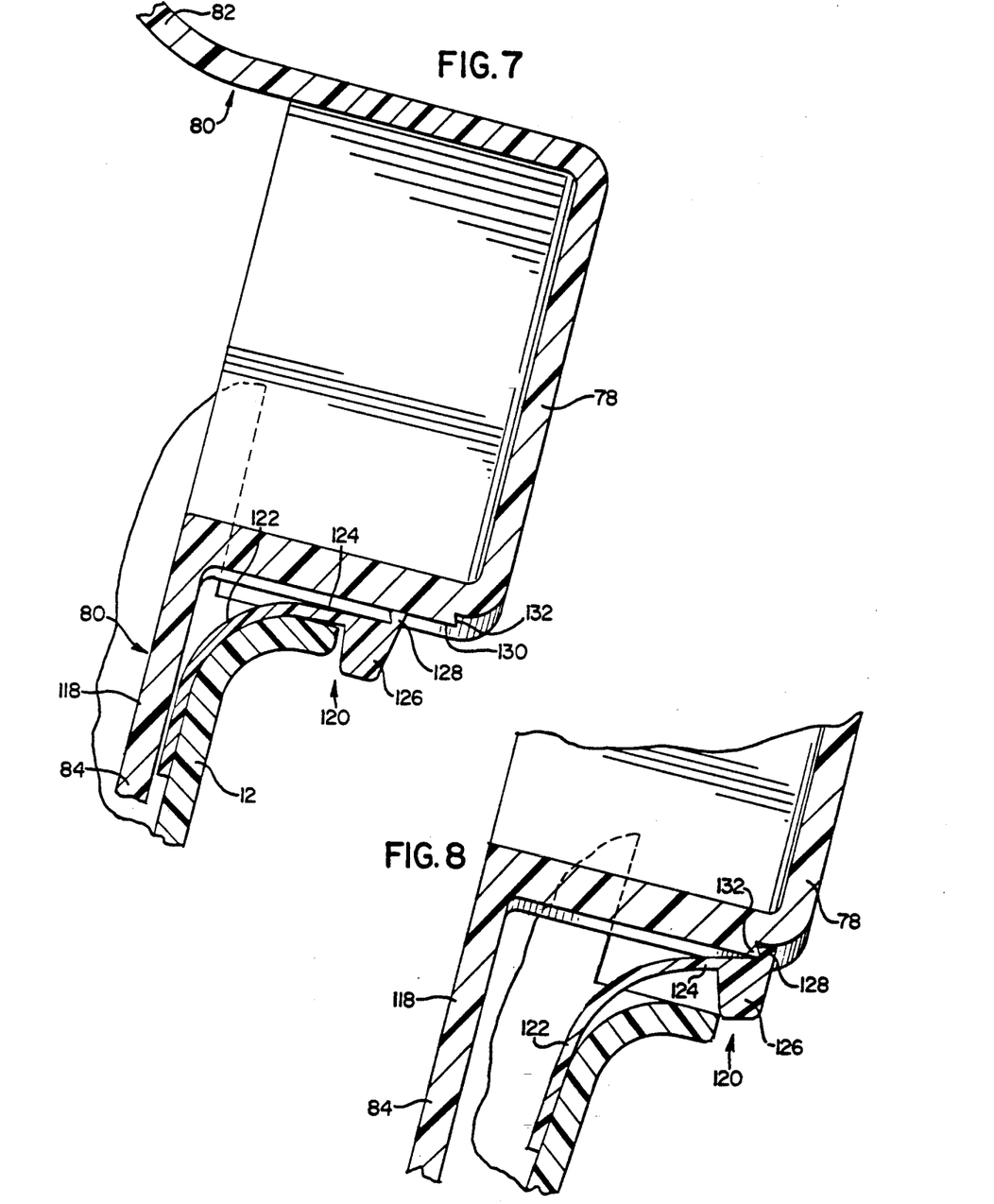
FIG. 7 is an enlarged fragmentary view showing an alternate embodiment of the trigger-like actuating member of a device in accordance with the present invention including a mechanism for locking the actuating member in position with the locking mechanism in a disengaged position.
FIG. 8 is an enlarged fragmentary view similar to that shown in FIG. 7 illustrating the locking mechanism of the trigger-like actuating member in an engaged position locking the member in an engaged or depressed state.

A modification of the spreading device 10 of this invention is shown in FIGS. 7 and 8 where a locking mechanism generally designated 120 is provided to lock actuating member 78 in an engaged, depressed position enabling maintenance of the valve opening at a desired level without requiring continuous application of pressure on the trigger 78. The locking mechanism 120 includes a leaf spring arm member 122 mounted within recess 32 in handle 14 adjacent trigger-like actuating member 78. Arm 122 projects outwardly from the handle 14 to a terminal end 124 having a locking pawl 126 formed thereon with a catch member or tang 128 at its distal end. As shown in FIG. 7, catch 128 projects upwardly from pawl 126 so as to abuttingly engage a lower surface 130 of actuating member 78 when the device 10 is in an idle condition with actuating member 78 in an undepressed state.

To lock trigger 78 in its engaged position, the trigger 78 is depressed into handle 14 until it reaches a preselected engagement position. In such position, catch 128 clears the corner of a downwardly projecting detent 132 formed on trigger 78 and the catch 128 is manually adjusted upwardly to cause pressure to be applied to the leaf spring arm 122 until it seats with the detent 132 and assumes the locked position illustrated in FIG. 8. As shown, the catch 128 is in locking contact with detent 132 and remains in such position after removal of force on the trigger 78 to dispense the desired amount of granular material onto impeller 42 without any additional application of force on the trigger 78.

In order to unlock trigger 78, force is applied to the trigger 78 to move it slightly inwardly of the locked position. In this position, the catch 128 will disengage from the detent 132 and the trigger 78 will return to its unlocked position under the influence of spring arm 122 which is loaded when the trigger 78 is moved into the locked position and is unloaded when the catch 128 is released from locking contact with detent 132. Thus, the trigger 78 is returned to the unlocked position.

Although the invention has been described in its preferred forms with a certain degree of particularity, it is to be understood that the present disclosure has been made by way of example only. Numerous changes in the details and construction of the combination and arrangement of parts will be apparent without departing from the spirit and scope of the invention, as defined in the appended claims.

I claim:

1. A hand-held material spreading device comprising:
   a housing having a storage chamber and a manually engagable pistol grip-type handle;
   said storage chamber being positioned over an impeller and including a port for discharging material from said storage chamber onto said impeller, said impeller being disposed and structured to rotate and to broadcast said material deposited thereon;

a valve member mounted for reciprocal motion across said port to regulate the flow of material in response to operation of an actuating assembly;

said actuating assembly including an actuating member mounted on the surface of said pistol grip-type handle and a dual spring arrangement interconnected with said actuating member; and said dual spring arrangement including a first spring for moving said valve member in response to movement of said actuating member to open said port to allow said flow of material and to close said port to stop such flow of material, said first spring also preventing damage of said device resulting from excessive movement of said actuating member and a second spring for biasing said actuating member to an initial, idle position and for causing said actuating member to return to said idle position after said actuating member has been moved.

2. The spreading device of claim 1 wherein said actuating member is a trigger-like member.

3. The spreading device of claim 1 wherein said first spring is operatively interconnected with said valve member via a linkage assembly so that upon movement of said actuating member, said first spring causes said linkage to pivot and to move said valve member.

4. The spreading device of claim 3 wherein said linkage assembly includes a triangular link member having pegs at each of the three corners of the triangle, one of said pegs providing a fulcrum for pivotal motion of said link member, a second of said pegs being structured and dimensioned to engage said actuating assembly and to cause said link member to pivot about said fulcrum and the third of said pegs being interconnected with said valve member to cause said valve to move in response to the pivotal movement of said link.

5. The spreading device of claim 3 wherein said first spring extends in a first direction from said actuating member and is structured and dimensioned to interconnect with said linkage and said second spring extends in a direction generally opposite said first direction and is structured and dimensioned to contact an inner wall of said pistol grip-type handle to provide a prestressed pressure for said biasing and said return of said actuating member.

6. The spreading device of claim 5 wherein said second spring has a hooked distal end skewed between about 5° and 25° relative to its vertical axis and said spring is force fit into said handle causing said skewed distal end of said spring to contact said inner wall and to conform to the shape of said inner wall resulting in a prestressed pressure for said biasing and said return of said actuating member.

7. The spreading device of claim 1 including a stop member on a rate adjusting assembly mounted to engage said valve member upon movement of said valve member a sufficient distance to provide a preselected extent of opening of said port.

8. The spreading device of claim 7 wherein said stop member on said rate adjusting assembly is a cam member having a cam stop surface which is positioned to contact said valve member and stop further movement thereof.

9. The spreading device of claim 8 wherein said rate adjusting assembly includes a manually manipulatable rate knob providing a number of selectable setting positions, said knob being rotatable to cause rotation of said cam member and to adjust said cam stop surface to a desired position.

10. The spreading device of claim 1 wherein said actuating member and said dual spring arrangement including said first and said second springs are formed as an integral, one piece assembly.

11. The spreading device of claim 1 including a locking mechanism for locking said actuating member in a position causing said valve member to be maintained in a position providing a preselected opening of said port.

12. The spreading device of claim 1 wherein said second spring has a hooked distal end section for providing a prestressed tension biasing said actuating member to said idle position.

13. The spreading device of claim 12 wherein said hooked distal end section is force fit into said handle causing said end section to generally conform to the shape 14. A hand-held spreading device comprising:

a housing including a storage chamber;

an impeller;

means for discharging material from said storage chamber onto said impeller for broadcasting said material;

an actuating assembly interconnected with said discharging means for operating said discharging means;

said actuating assembly including an actuating member and a dual spring arrangement interconnected with said actuating member;

said dual spring arrangement including a first spring extending from said actuating member in a first direction and a second spring extending from said actuating member in a direction generally opposite said first direction;

said first spring being structured and dimensioned to cause said discharging means to discharge material in response to movement of said actuating member and to prevent damage of said device resulting from excessive movement of said actuating member; and said second spring being structured and dimensioned to bias said actuating member to move to an idle position at which said first spring will not cause said discharging means to discharge material and for causing said actuating member to return to said idle position after said actuating member has been moved.

15. The spreading device of claim 14 wherein said actuating member and said dual spring arrangement including said first and said second springs are formed as an integral, one piece assembly.

16. The spreading device of claim 14 including a locking means for locking said actuating member in a position at which said first spring causes said discharging means to discharge material.

17. The spreading device of claim 14 wherein said first spring is structured and dimensioned to collapse upon excessive movement of said actuating means to prevent said damage of said device.

18. The spreading device of claim 14 wherein said second spring is structured and dimensioned to provide a prestressed pressure on said actuating member after installation in said device whereby said actuating member is biased to said idle position and is caused to return to said idle position after movement.

19. The spreading device of claim 14 including a manually engagable handle with said actuating assembly being positioned in said handle and said actuating member being a trigger-like member positioned and configured for alleviating fatigue of a user's hand during use of said device.

20. The spreading device of claim 19 wherein said handle is a pistol grip-type handle.

* * * * *

UNITED STATES PATENT AND TRADEMARK OFFICE
CERTIFICATE OF CORRECTION

PATENT NO. : 5,123,598
DATED : June 23, 1992
INVENTOR(S) : Courtney et al.

It is certified that error appears in the above—identified patent and that said Letters Patent is hereby corrected as shown below:

Column 10, Line 14, please insert after "shape" --of an inner wall for said handle and to provide a prestressed pressure which is transmitted to said actuating member via said second spring for biasing said actuating member to said initial, idle position and for causing said actuating member to return to said idle position after said actuating member has been moved.--

Signed and Sealed this

Twenty-first Day of September, 1993

Attest:

BRUCE LEHMAN

Attesting Officer

Commissioner of Patents and Trademarks